United States Patent Office 3,455,389
Patented July 15, 1969

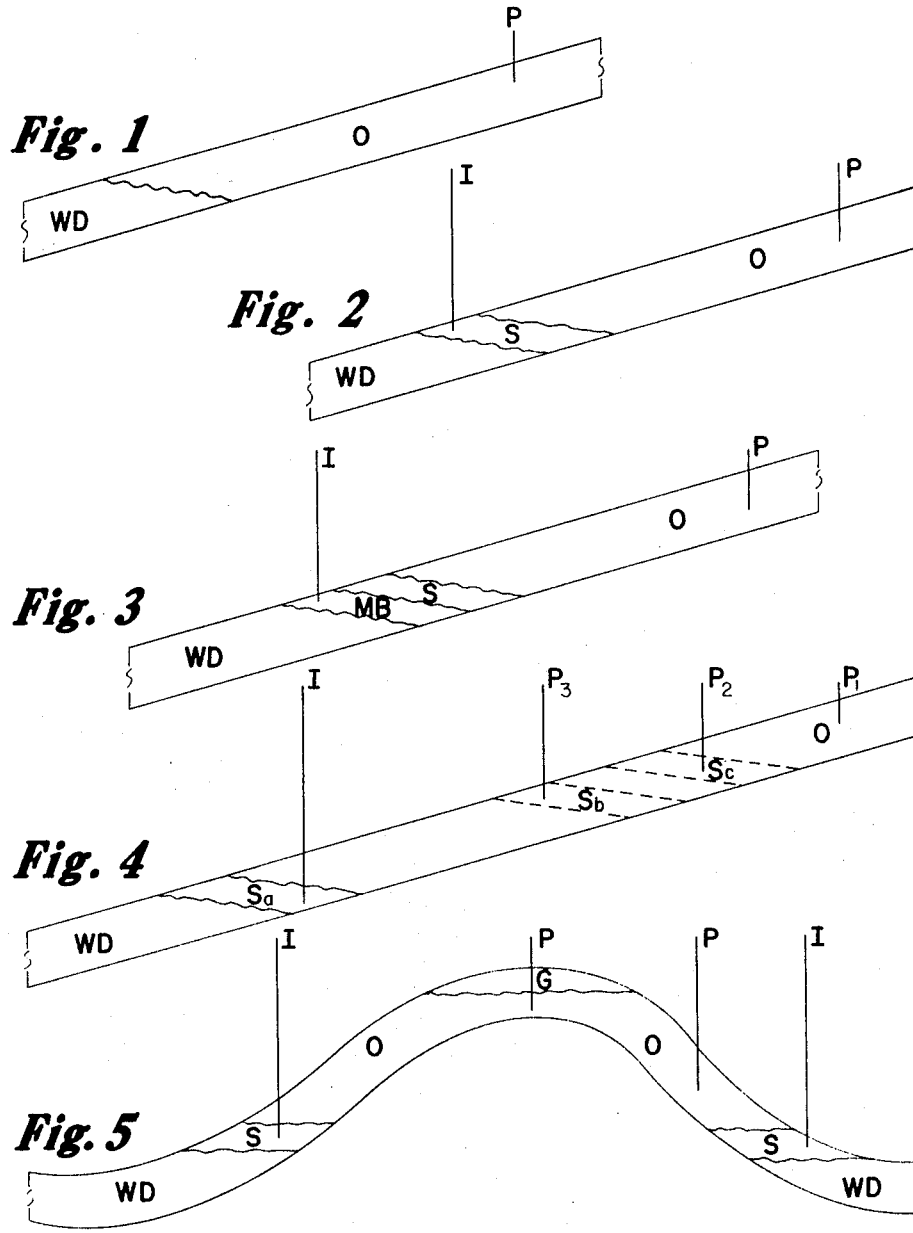

3,455,389
PRODUCTION FROM SUBTERRANEAN FORMATIONS USING MICELLAR DISPERSIONS
William B. Gogarty, Littleton, Colo., assignor to Marathon Oil Company, Findlay, Ohio, a corporation of Ohio
Filed Dec. 26, 1967, Ser. No. 693,450
Int. Cl. E21b 43/16, 43/20
U.S. Cl. 166—274                    19 Claims

ABSTRACT OF THE DISCLOSURE

Production of formation fluids from an oil-bearing permeable subterranean formation characterized as having hydrodynamically controlled water naturally displace the formation fluids toward a production means, is improved by injecting a micellar dispersion at the interface of the formation fluids and the water; optionally, a mobility buffer fluid can be injected behind the micellar dispersion.

BACKGROUND OF THE INVENTION

Micellar dispersions are useful in secondary-type recovery processes (especially tertiary recovery) for recovering residual oil in a subterranean formation. This is usually effected by injecting a micellar dispersion into the formation and displacing it by a water drive towards at least one production means and recovering crude petroleum therefrom. Recovery of up to about 100% of the oil in place can be realized from such a process. Examples of such systems are defined in United States Patent Nos. 3,275,075, 3,261,399, and 3,254,714.

Applicant has discovered that production from a permeable subterranean formation characterized as having hydrodynamically controlled water displace formation fluids can be improved by injecting a micellar dispersion (and optionally a mobility buffer) at the interface of the formation fluids and the water. Preferably, the micellar dispersion is characterized as having a specific gravity between that of the formation fluids and that of the water. The term "formation fluids" as used herein defines crude petroleum plus interstitial water. Recovery of the crude petroleum is the ultimate purpose of this invention but it is recognized that some interstitial water will be recovered along with the crude petroleum. Therefore, wherever crude petroleum is used it is meant to include interstitial water—this combination also referred to as formation fluids.

DESCRIPTION OF THE DRAWINGS

FIGURE 1 represents a cross section of a formation having WD (hydrodynamically controlled water drive) naturally displacing O (oil or crude petroleum) towards P (production means).

FIGURE 2 represents the same formation having I (injection means) in fluid communication with the formation and S (a micellar dispersion slug) at the interface of O and WD.

FIGURE 3 is similar to FIGURE 2 except MB (a mobility buffer fluid) is injected after S. Preferably, MB has a specific gravity between that of S and WD.

FIGURE 4 illustrates a formation having a series of P's and small but sufficient amounts of micellar dispersion slugs are injected through I, $P_3$ and $P_2$ at the O/WD interface as the WD displaces the O towards $P_3 \rightarrow P_2 \rightarrow P_1$, i.e. $S_a$ is initially injected, then as the rear end of O approaches $P_3$ (i.e. as $P_3$ is about to "water out"), $S_b$ is injected through $P_3$ and as the rear end of O approaches $P_2$, $S_c$ is injected through $P_2$— the O is produced at any or all P's "upstream" of the micellar dispersion.

FIGURE 5 represents a practical application of this invention wherein production from an anticline formation is improved by having slugs S at the interfaces of O and WD. The formation can have G (gas cap).

DESCRIPTION OF THE INVENTION

The oil-bearing formations useful with this invention include those reservoirs characterized as having a hydrodynamically controlled water drive. The term "hydrodynamically controlled water drive" is meant to include aquifers as taught in Chapter 5, Craft and Hawkins' Applied Petroleum Reservoir Engineering, Prentice-Hall, Inc. (1959). Means for supplying the hydrodynamically controlled water drive include (a) expansion of water, (b) expansion of known or unknown hydrocarbon accumulations in aquifer rock, (c) compressibility of the aquifer rock, (d) artesian flow where the aquifer rises to a level above the reservoir whether it outcrops or not, and whether or not the outcrop is replenished by surface water, and (e) any means wherein water is moved through the formation. The formation should be permeable to crude petroleum, micellar dispersions, mobility buffers, and the water drive. One or more production means can be drilled into the formation to produce the crude petroleum. Examples of reservoirs include anticlines (the anticline can have a gas cap, however, the primary drive means of the reservoir will be the hydrodynamically controlled water), a monocline having a stratographic trap at the higher elevation and a water drive at the lower end of the formation.

The term "micellar dispersion" as used herein is meant to include "microemulsions" [Schulman and Montagne, Annals of the New York Academy of Sciences, 92, pages 336–371 (1961)], oleopathic hydro-micelles [Hoar and Schulman, Nature, 152, page 102 (1943)], "transparent" emulsions (Blair et al., United States Patent No. 2,356,205) and micellar solutions, examples of the latter are defined in United States Patent Nos. 3,254,714; 3,275,075; 3,301,325; 3,307,628; and 3,330,344. Micellar dispersions are thermodynamically stable. Examples of micellar dispersions include those found in United States Patent No. 3,348,611 to Reisberg.

The micellar dispersion is composed essentially of a hydrocarbon, an aqueous medium such as water, and a surfactant sufficient to impart micellar characteristics to the mixture. Examples of hydrocarbon include crude oil, straight-run gasoline such as lower hydrocarbon fractions equal to or greater than at least pentane, crude column overheads, and liquefied petroleum gases. Useful surfactants include alkyl aryl sulfonates, more commonly known as petroleum sulfonates or as alkyl aryl naphthenic sulfonates. Such petroleum sulfonates can be identified by the empirical formula $C_nH_{2n-10}SO_3M$ wherein $n$ is an integer from about 20 to about 30 and M is a monovalent ion such as sodium, potassium, ammonium, etc. Examples of other useful surfactants are found in United States Patent No. 3,254,714.

In addition, the micellar dispersion can contain a semipolar organic compound (also identified as co-surfactants) such as ketones, esters, amides, and alcohols containing from one up to about 20 carbon atoms. Preferably, the semi-polar compound is an alcohol, e.g. ethanol, isopropanol, n- and isobutanol, the amyl alcohols, 1- and 2-hexanol, 1- and 2-octanol, decyl alcohols, p-nonyl phenol, and alcoholic liquors such as fusel oil. Two or more semi-polar organic compounds are useful.

Also, electrolytes such as inorganic bases, inorganic acids, inorganic salts, organic bases, organic acids, and organic salts can be incorporated into the micellar dispersion. Examples of useful electrolytes are found in United States Patent Nos. 3,297,084 and 3,330,343. Preferably, the electrolytes are inorganic acids, inorganic bases, and inorganic salts. Examples of preferable electrolytes include sodium sulfate, sodium chloride, sodium hydroxide, hydrochloric acid, sulfuric acid, and sodium nitrate.

The micellar dispersion can be water-external or oil external. It is preferred that the micellar dispersion consist of five components, i.e. hydrocarbon, aqueous medium, surfactant, electrolyte and semi-polar compound.

The micellar dispersion preferably has a specific gravity and viscosity between that of the formation fluids and the water drive. More preferably, the micellar dispersion can be characterized as having graded specific gravities from a low at the formation fluids juncture to a high at the water drive. Mobility of the micellar dispersion can be about equal to or less than that of the formation fluids. Also, it is contemplated that a portion of the micellar dispersion can have graded mobilities from a low of the formation fluids to a high of the water drive, and more preferably that the mobilities be graded with distance by a semi-logarithmic straight-line function.

Optionally, the micellar dispersion is followed by a mobility buffer. The mobility buffer should be compatible with the micellar dispersion and water drive. Purpose of the mobility buffer is to serve as a buffer between the micellar dispersion and the water drive, thus protecting the micellar dispersion from invasion by the water drive. The mobility buffer can be a lower molecular weight alcohol containing from 1 up to about 4 carbon atoms, a water-external emulsion, a water-external micellar dispersion, a thickened water, or any fluid acting similar to these. It can contain a mobility imparting agent (also identified as a thickening agent and viscosity imparting agent) to give the desired mobility. Preferably, the mobility buffer is composed of an aqueous medium such as water and a thickening agent. Other components, e.g. corrosion inhibitors, bactericides, etc., can be incorporated into the mobility buffer to give desired characteristics. Examples of mobility imparting agents include sugars, dextrans, carboxy methylated cellulose, amines, polymers, glycerins, alcohols and mixtures of these agents. A particularly useful agent with aqueous medium is a high molecular weight partially hydrolyzed polyacrylamide, e.g. the Pusher products sold by Dow Chemical Company.

Where the mobility buffer is composed substantially of hydrocarbon, thickening agents such as different molecular weight polyisobutylenes can be used to increase the mobility thereof.

The mobility buffer preferably has a specific gravity between that of the formation fluids and the water drive and more preferably, between that of the micellar dispersion and the water drive. Also, the mobility buffer can have a mobility about equal to or less than that of the micellar dispersion. In addition it can have an average mobility between that of the formation fluids and the water drive and more preferably between that of the micellar dispersion and the water drive. A preferred embodiment of this invention is to have at least a portion of the mobility buffer (e.g. from about 5% to about 100%) characterized as having mobilities graded from a low of the micellar dispersion to a high of the water drive, and more preferably that it be graded with distance by a semi-logarithmic straight-line function.

Preferably, the formation fluids should be produced at a rate such that the velocity of fluids within the formation is below that of the critical velocity at which gravities of the crude oil and the micellar dispersion substantially integrate to cause fingering. That is, gravity segregation is preferably maintained throughout the process to protect against fingering. This gravity segregation phenomenon is discussed by R. J. Blackwell, J. R. Rayne, and W. M. Terry, "Factors Influencing the Efficiency of Miscible Displacement," AIME Transactions, T.P. 8047, page 6.

From about 1% up to about 20% formation pore volume of the micellar dispersion is preferred to effect efficient sweeping of the formation. More preferably, from about 2% up to about 10% formation pore volume is useful. The micellar dispersion can be followed with from about 1% to about 75% formation pore volume of mobility buffer—more preferably from about 10% up to about 50% is useful. Where the mobility difference between the formation fluids and the water drive are large it is preferred to use larger amounts of mobility buffer, i.e. greater than 5% formation pore volume.

After the micellar dispersion and optionally the mobility buffer is injected through the injection means into the formation, the injection means is "shut-in" and the water drive is permitted to move these fluids through the formation.

It is intended that the invention not be limited by the specifics taught within this application, but that all equivalents obvious to those skilled in the art be included within the scope of the invention.

What is claimed is:

1. A process of increasing the formation fluids recovery from a permeable subterranean formation characterized as having at least one production means in fluid communication with at least one injection means and the formation being hydrodynamically controlled, the process comprising injecting into the formation at substantially the interface of the formation fluids and the hydrodynamically controlled water a small but sufficient amount of a micellar dispersion to increase the recovery of formation fluids from the formation and letting the hydrodynamically controlled water displace the formation fluids and the micellar dispersion toward the production means.

2. The process of claim 1 wherein the micellar dispersion is characterized as having a specific gravity between that of the formation fluids and the hydrodynamically controlled water.

3. The process of claim 1 wherein the micellar dispersion has a mobility about equal to or less than that of the formation fluids.

4. The process of claim 1 wherein the micellar dispersion is characterized as having an average mobility between that of the formation fluids and that of the hydrodynamically controlled water.

5. The process of claim 1 wherein a portion of the micellar dispersion is characterized as having graded mobilities from a low of the formation fluids to a high of the hydrodynamically controlled water.

6. The process of claim 1 wherein a mobility buffer is injected into the subterranean formation after the micellar dispersion is injected therein.

7. The process of claim 6 wherein the mobility buffer has a mobility about equal to or less than that of the micellar dispersion.

8. The process of claim 6 wherein a portion of the mobility buffer is characterized as having graded mobilities from a low of the micellar dispersion to a high of the hydrodynamically controlled water.

9. The process of claim 1 wherein the formation fluids are produced at a rate such that the velocity of the formation fluids is below that of the critical velocity at which gravities of the formation fluid and micellar dispersion substantially integrate to cause fingering.

10. The process of claim 1 wherein from about 1 to about 20% formation pore volume of the micellar dispersion is injected into the formation.

11. A process of increasing the formation fluids recovery from a permeable subterranean formation having at least one production means in fluid communication with at least one injection means and the formation characterized as being hydrodynamically controlled, the process comprising:

(1) injecting into the formation at substantially the interface of the formation fluids and the hydrodynamically controlled water from about 1% to about 20% formation pore volume of a micellar dispersion, then (2) injecting into the formation from about 1% to about 75% formation pore volume of a mobility buffer, and letting the hydrodynamically controlled water displace the micellar dispersion, and mobility buffer toward the production means and recovering formation fluids through the production means.

12. The process of claim 11 wherein the micellar dispersion is characterized as having an average specific gravity between that of the formation fluids and that of the hydrodynamically controlled water.

13. The process of claim 11 wherein the micellar dispersion has a mobility about equal to or less than that of the formation fluids.

14. The process of claim 11 wherein the micellar dispersion is characterized as having an average mobility between that of the formation fluids and that of the hydrodynamically controlled water.

15. The process of claim 11 wherein the mobility buffer has an average specific gravity between that of the micellar dispersion and that of the hydrodynamically controlled water.

16. The process of claim 11 wherein the mobility buffer is characterized as having an average mobility between that of the micellar dispersion and that of the hydrodynamically controlled water.

17. The process of claim 11 wherein a portion of the mobility buffer is characterized as having mobilities graded from a low of the micellar dispersion to a high of the water drive.

18. The process of claim 17 wherein the portion of mobility buffer is graded with distance by a semi-logarithmic straight-line function.

19. The process of claim 11 wherein the formation fluids are produced at a rate such that the velocity of the formation fluids is below that of the critical velocity at which gravities of the formation fluids and the micellar dispersion substantially integrate to cause fingering.

References Cited

UNITED STATES PATENTS

| | | | |
|---|---|---|---|
| 2,885,003 | 5/1959 | Lindauer | 166—9 |
| 3,261,399 | 7/1966 | Coppel | 166—9 |
| 3,266,570 | 8/1966 | Gogarty | 166—9 |
| 3,312,278 | 4/1967 | Warden | 166—9 |
| 3,324,944 | 6/1967 | Poetmann | 166—9 |
| 3,330,344 | 7/1967 | Reisberg | 166—9 |
| 3,348,611 | 10/1967 | Reisberg | 166—9 |
| 3,373,809 | 3/1968 | Cooke | 166—9 |

STEPHEN J. NOVOSAD, Primary Examiner